United States Patent
White, Jr.

[11] 3,737,179
[45] June 5, 1973

[54] SUBMARINE CONNECTION FOR MISALIGNED PIPES

[75] Inventor: William E. White, Jr., Houston, Tex.

[73] Assignee: Hydrotech Services Inc., Houston, Tex.

[22] Filed: Jan. 20, 1972

[21] Appl. No.: 219,413

[52] U.S. Cl. ............285/96, 285/105, 285/184, 285/367, 285/368
[51] Int. Cl. ............................................F16l 17/00
[58] Field of Search.....................285/184, 96, 97, 285/104, 105, 181, 368, 367

[56] References Cited

UNITED STATES PATENTS

| | | | |
|---|---|---|---|
| 1,880,098 | 9/1932 | Mair | 285/184 |
| 3,420,554 | 1/1969 | Straub | 285/97 |
| 1,898,623 | 2/1933 | Gammeter | 285/104 X |
| 1,756,094 | 4/1930 | McGuirk | 285/181 |
| 960,899 | 6/1910 | Guyer | 285/184 X |
| 3,486,772 | 12/1969 | Elsner | 285/96 |
| 3,582,112 | 6/1971 | Pico | 285/105 X |

FOREIGN PATENTS OR APPLICATIONS

| | | | |
|---|---|---|---|
| 964,665 | 2/1950 | France | 285/181 |
| 1,282,372 | 11/1968 | Germany | 285/96 |
| 410,600 | 5/1934 | Great Britain | 285/184 |
| 691,653 | 5/1953 | Great Britain | 285/184 |

Primary Examiner—Thomas F. Callaghan
Attorney—Paul E. Harris, Lee R. Larkin, Marcus L. Thompson and Larry B. Phillips

[57] ABSTRACT

Apparatus for connecting together two pipes which are misaligned and which may be in a hostile environment, as for example, underwater. A pair of housings, each of which is arranged for slidable mounting over the adjacent pipe ends to be coupled, are each provided with a fluid actuatable, annular, radially movable resilient seal and gripping means arranged to engage the surface of the pipes. Adjacent ends of the housings carry bias flanges arranged for mating contact through a plurality of relative connector angular positions.

3 Claims, 4 Drawing Figures

PATENTED JUN 5 1973    3,737,179
FIG.1
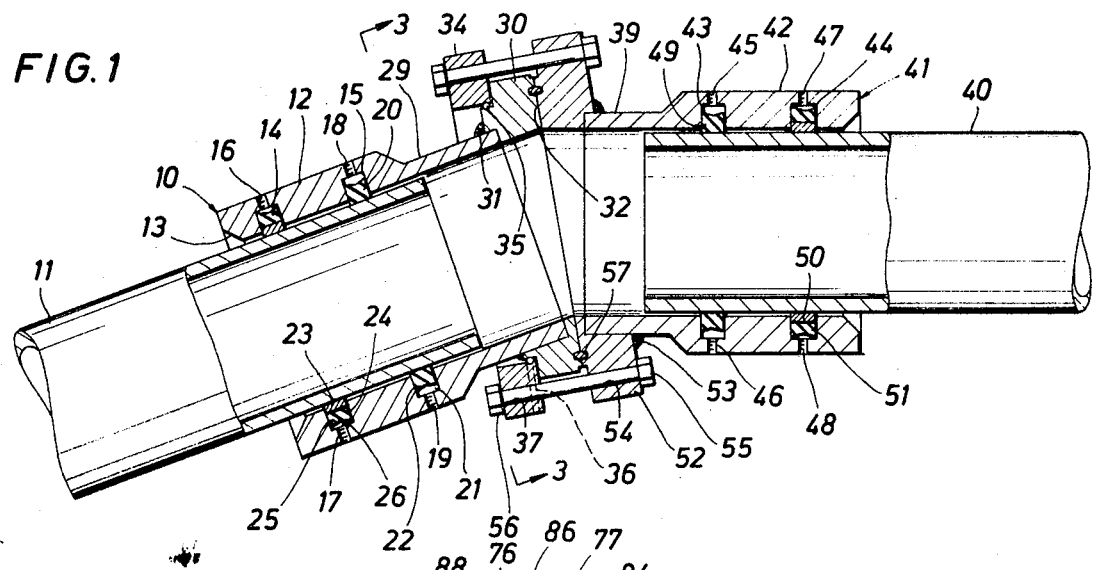
FIG.2
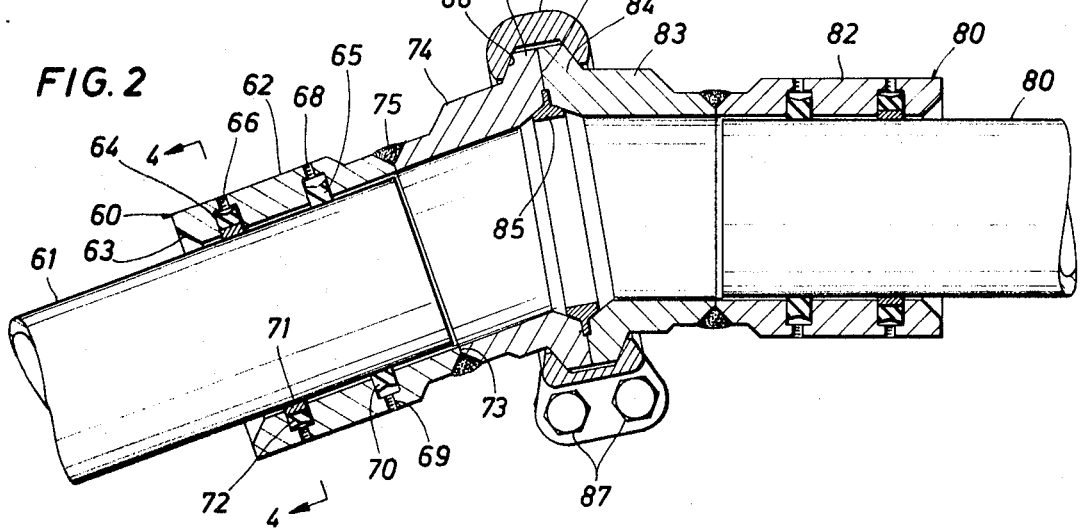
FIG.3
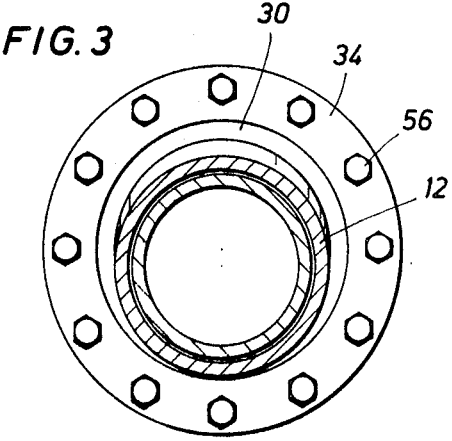
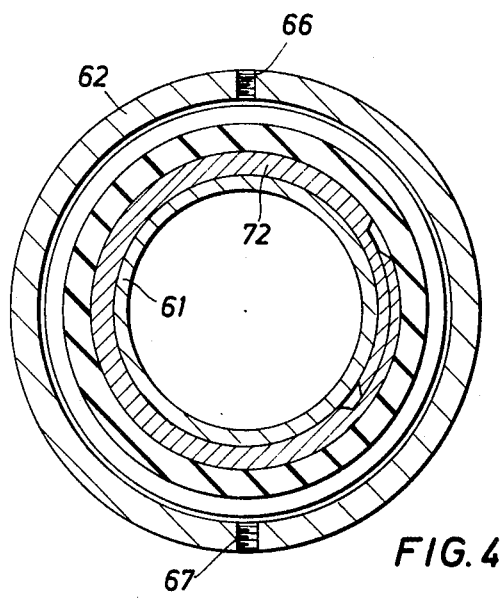
FIG.4

SUBMARINE CONNECTION FOR MISALIGNED PIPES

BACKGROUND OF THE INVENTION

Apparatus for coupling two pipes which are misaligned and which may be in a hostile environment to produce a pressure tight mechanically rigid connection.

DESCRIPTION OF THE PRIOR ART

When originally interconnecting two pipes underwater or in other similar hostile environments, or when trying to connect ends of an underwater pipe which has been broken, it is usually not too difficult to move the pipe ends so that they are fairly close together with intersecting center lines. However, it is frequently difficult to position the pipes so that their center lines coincide and their ends match. Nevertheless, all prior art interconnection methods and apparatus suitable for use with high pressure pipes, such as undersea oil and gas production pipes, require such center line coincidence and precision end matching to bring the pipe ends exactly together prior to interconnection.

One alignment solution offered by the prior art is the apparatus shown in Martin U.S. Pat. No. 3,566,505. That apparatus is arranged for clamping to the pipe ends and for hydraulic manipulation of the ends to produce center line coincidence and end matching. Other prior art solutions include the use of underwater welding compartments arranged for clamping to the pipe ends and hydraulic manipulation of the ends to achieve alignment prior to dry atmosphere welding.

All such prior art methods and apparatus are cumbersome to use and very expensive to construct and operate.

SUMMARY OF THE INVENTION

The instant invention uses a connection principle contrary to that used by the foregoing prior art high pressure pipe connectors. Rather than manipulate the pipe ends to achieve coaxial alignment and perfect end match, the misalignment is accepted and appropriate dimensional compensation is provided in the coupling.

This invention includes a pair of connectors, each of which includes a generally tubular housing arranged for mounting over the end of one of the pipes to be coupled. Annular, generally radially compressible seal means are carried by the housings and are arranged to encircle the pipe and are arranged to be radially actuated by fluid pressure to produce a seal between the pipe and each of the housings. Similarly, fluid actuatable gripping means are carried by each housing and arranged to frictionally engage the pipe upon actuation to produce a rigid mechanical connection between the housing and the pipe.

Adjacent ends of the housings carry bias flanges arranged for mating contact through a plurality of flange relative angular positions. Means are provided for rigidly coupling the mating flanges.

BRIEF DESCRIPTION OF THE DRAWING

FIG. 1 is a partial central sectional view of one embodiment of this invention used to couple two linearly displaced angularly misaligned pipes.

FIG. 2 is a view similar to FIG. 1 but showing an alternate means for rigidly connecting the bias flanges together.

FIG. 3 is a cross-sectional view taken along 3—3 of FIG. 1.

FIG. 4 is a cross-sectional view taken along 4—4 of FIG. 2.

DESCRIPTION OF THE PREFERRED EMBODIMENTS

Referring now to FIG. 1, a first connector 10 is shown slidingly positioned over the end of pipe 11. Connector 10 includes a generally tubular housing 12 and the left end thereof, as shown in FIG. 1, is provided with a beveled annular surface 13 to facilitate the sliding installation of housing 12 on pipe 11.

Housing 12 is provided with a pair of axially spaced apart annular recesses 14 and 15 which face generally radially inward towards the outer surface of pipe 11. Housing 12 is also provided with a first pair of conduits 16 and 17 therethrough, arranged to communicate with recess 14, and a similar pair of conduits 18 and 19 arranged to communicate with recess 15. Conduits 16–19 are used to allow introduction of a pressurized actuation fluid into recesses 14 and 15, as described below.

An annular resilient seal 20 is mounted or supported in recess 15, thereby forming a closed annular chamber 21 radially outward therefrom or radially therebehind. The radially outward surface of seal 20 is provided with a V-shaped groove 22 which thereby provides lips for sealing and engaging seal 20 with the sides of recess 15. It is to be understood that recess 15 and seal 20 may be tapered at an approximate 6° radially inward direction to increase or improve the sealing effect between recess 15 and seal 20. Seal 20 is constructed of a resilient, radially deformable substance such as neoprene rubber so that when a pressurized fluid is introduced through conduits 18 or 19 therebehind, seal 20 will be forced radially inward into sealing engagement between housing 12 and pipe 11. If desired, one-way or check valves (not shown) could be installed on conduits 18 and 19 so that pressurized fluid applied thereto would be retained therein to effect a permanent seal. In addition, if permanent installation is desired, the pressurizing fluid could be an epoxy resin or similarly hardenable material arranged to set-up and form a hardened ring of material behind seal 20.

Recess 14 in coupling 12 is provided with a fluid pressure actuatable gripping means arranged, upon actuation, to frictionally engage the outer surface of pipe 11 to thereby rigidly attach housing 12 to pipe 11. This gripping means takes the form of a split slip ring 23 which is provided with gripping teeth on the internal surface thereof arranged to frictionally engage the external surface of pipe 11, when actuated. Slip ring 23 is supported on the radially outward side thereof by a resilient grip seal ring 24 which is similarly provided with a V-shaped recess 25 about the external surface thereof. It is to be understood that recess 14 and ring 24 may likewise be tapered radially inward at approximately 6° to facilitate support and sealing of ring 24 in recess 14. It is to be further understood that like seal 20, grip seal ring 24 can be made of neoprene rubber or the like. Upon radially inward movement of ring 24, split slip ring 23 is urged radially inward into frictional engagement with pipe 11, thereby locking housing 12 with pipe 11. Although shown as a split slip ring, ring 23 could be composed of a plurality of partial circumferential gripping segments secured to resilient seal ring 24.

The radially outward portion of ring 24 similarly forms a closed annular chamber 26 with housing 12 into which a pressurized fluid may be introduced through conduits 16 and 17. Like conduits 18 and 19, conduits 16 and 17 may be provided with appropriate fittings for connection to valves and other conduits and the like, which are in turn connected to appropriate pressurized fluid sources (not shown) such as pressurized hydraulic fluid. Similarly, conduits 16 and 17 can be terminated in one-way valves arranged to retain any pressure introduced into chamber 26. If it is desired to have a permanent connection between housing 12 and pipe 11, the pressurized fluid which is introduced through conduits 16 and 17 into chamber 26 may be in the form of a pressurized epoxy resin or similarly hardenable material which hardens to maintain a radially inward force upon seal ring 24 and slip ring 23.

As shown in FIG. 1, the righthand end of housing 12 has an extension nipple 29 formed thereon and nipple 29 terminates in a bias cut flange support 30 which is connected to nipple 29 by weld 31. Flange support 30 may be eccentrically machined or otherwise constructed so that, when fully seated upon housing 12, the right hand or outer face 32 of support 30 will form a major angle of less than 90° with the axis of housing 12. Preferably this major angle should lie in the range of from 60° to 89°.

Flange support 30 is provided with a stepped annular groove 33 about the left end thereof, as viewed in FIG. 1, upon which is seated a rotatable clamp ring or flange 34. A partially semi-circular bearing race or groove is formed in the radially adjacent portions of flange support 30 and of rotatable flange 34, in which are positioned a plurality of bearings 35. Although shown as ball bearings, bearings 35 could be roller bearings or other suitable bearing means positioned between flange support 30 and rotatable flange 34 for easing rotation of flange 34 with respect to housing 12.

Rotatable flange 34 is provided with a radially extending conduit 36 therethrough which is used for the installation of bearings 35. Conduit 36 may be plugged with a threaded member or by welding after bearings 35 have been installed. Flange 36 is also provided with a plurality of axially extending bolt holes 37 which are used for connecting flange 34 to another flange, as described below. The hole pattern for bolt holes 37 may be seen in FIG. 3.

As seen in FIG. 1, a second pipe 40 is shown which is linearly displaced and angularly misaligned with pipe 11, but whose center line intersects the center line of pipe 11. A second connector 41 is slidably positioned over the end of pipe 40. Connector 41 similarly includes a tubular housing 42 in which are machined annular recesses 43 and 44 and radial conduits 45 through 48, respectively. Similarly, recess 43 is provided with an annular, radially deformable seal 49 arranged to be forced radially inward into sealing engagement between housing 42 and pipe 40. And, recess 44 is provided with a split slip ring 50 backed up by a resilient grip seal ring 51. The description and functions of seal 49, slip ring 50 and seal ring 51 correspond with those described above for seal 20, slip ring 23 and seal ring 24.

As viewed in FIG. 1, the lefthand end of housing 42 has an extension nipple 39 formed thereon and nipple 39 terminates in a bias cut flange 52 which is welded upon nipple 39 by weld 53. As with flange support 30, flange 52 may be eccentrically machined or otherwise constructed so that, when fully seated upon housing 42, a major angle of less than 90° is formed with respect to the axis of housing 42. Again it is preferable that this major angle lie in the range of from 60° to 89°. Flange 62 is similarly provided with a plurality of axially extending bolt holes 54, through which are placed bolts 55 which are anchored behind rotatable flange 34 by nuts 56. The adjacent mating surfaces of flange support 30 and flange 52 are provided with an annular circumferential recess in which is positioned a conventional flange seal 57.

In operation pipes 11 and 40 are positioned so that their center lines intersect with a linear displacement between the ends thereof equal to or less than the total lengths of nipples 29 and 39, and connectors 10 and 41 are respectively slidably positioned on pipes 11 and 40. It is to be understood that at this time seals 20 and 49 are positioned radially outward in recess 15 and 43, respectively, as are split slip rings 23 and 50 in recesses 14 and 44, respectively. Connectors 12 and 42 are rotated upon pipes 11 and 40 until the adjacent flange faces thereof are parallel. Thereafter, rotatable flange 34 is rotated until the bolt holes 37 therein align with bolt holes 54 in flange 52. Bolts 55 are then inserted through bolt holes 54 and 37 and nuts 56 are placed on bolts 55 and are drawn up tight to force the connectors together, compressing seal 57. Next, a pressurized hydraulic fluid may be inserted through conduits 16–19 and 45–48 to actuate the seals and gripping elements of the connectors on pipes 11 and 40, to complete the connection.

Referring now to FIG. 2, a similar pipe arrangement is shown wherein similar seal means and gripping means are used in conjunction with a second type of biased flange connection. In this embodiment, a first connector 60 is shown slidably positioned over the end of a first pipe 61. Connector 60 similarly includes a housing 62 having an inwardly tapered annular beveled surface 63 at the left end thereof, as viewed in FIG. 2, to facilitate installation thereof on pipe 61. Connector 62 is provided with a pair of axially spaced apart generally radially inwardly facing annular recesses or grooves 64 and 65. Housing 62 is also provided with a plurality of radial conduits 66–69 arranged to communicate with recesses 64 and 65.

An annluar resilient seal 70 is mounted in recess 65, and a gripping means in the form of a split slip ring 71 supported by a resilient grip seal ring 72 is mounted in recess 64. The forward or righthand end of housing 62 terminates in a tubular surface 73 normal to the axis of housing 62. Coupling 60 is also provided with a bias cut flanged adapter or nipple 74 which is secured to housing 62 by weld 75. The right-hand end of adapter 74 terminates in a tapered flange 76, the outer surface 77 of which lies in a plane forming a major angle of less than 90° with the axis of connector 60, as described above.

Referring now to the righthand side of FIG. 2, a second pipe 80 is illustrated, the axis of which intersects but is not coincident with the axis of pipe 61. Slidingly mounted upon the end of pipe 80 is a connector 81 which is identical in configuration and operation with connector 60 described above. Connector 80 likewise includes a housing portion 82 and a flange adapter or nipple portion 83 welded thereto. The lefthand end of flange adapter portion 83 terminates in a tapered flange 84, similarly having an outer end surface which forms a major angle of less than 90° with the axis of pipe 80.

The radially inward adjacent portions of flanges 76 and 84 are provided with mating annular grooves arranged to accept a seal ring 85 therebetween. Seal ring 85 can be formed of any suitable material, such as coated carbon steel.

Flanges 76 and 84 are clamped together by means of a segmented clamp ring 86 formed of two semi-circular halves joined together by bolts 87. The radially inward side surfaces 88 of clamp ring 86 are tapered to matingly engage the outer surfaces of tapered flanges 76 and 84.

In operation, connectors 60 and 81 are slidably positioned over the ends of pipe 61 and 80, respectively. Pipes 61 and 80 are then manipulated to cause their center lines to intersect with the linear displacement therebetween equal to or less than the total length of adapters 74 and 83. Connectors 60 and 81 are then rotated until the adjacent surfaces of flanges 76 and 84 are parallel, and are then forced together against seal ring 85. Clamp ring 86 is then positioned about flanges 76 and 84 and is secured thereto by bolts 87. Thereafter, the seal means and gripping means of the two connectors may be energized by introducing a pressurized hydraulic fluid thereto, as described above, causing the seal means to form a sealing engagement between the respective connectors and pipes and to cause the split slip rings to form a mechanical, frictional engagement between the respective couplings and pipes.

The apparatus of this invention, as described above, is particularly useful in repairing or installing high pressure submarine pipes in that extremely close tolerances are not necessary between the I.D. of the coupling and O.D. of pipes to be connected, but a connection may still be made which is equal to or greater in strength than the original pipe strength. For example, with pipes having a 4 inch O.D., it has been found that there may be as much as one-half inch of total difference between the O.D. of the pipe and the I.D. of the coupling and a proper seal and gripping action will still be maintained. Similarly, by merely rotating the couplings in each pair relative to each other on the pipes to be connected, the connectors can be used for various angles of misalignment in the pipes. This feature is important since it is difficult and very expensive to try to coaxially align large production pipe sections, particularly when all or part of the sections are underwater and have been buried.

Moreover, this invention permits the connection of two pipes without requiring that either pipe be rotated on its longitudinal axis, as is the case with threaded couplings.

Further modifications and alternative embodiments of the invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is Claimed Is:

1. In an underwater pipeline construction for connecting two misaligned underwater fluid transmission pipes, the combination comprising:
    a pair of couplings, each of which includes a generally tubular housing arranged for slidably mounting over the end of one of said underwater pipes to be connected;
    fluid pressure actuatable generally radially deformable resilient sealing means mounted in each of said housings for encircling said pipe on which said coupling is mounted and for sealing the annular space between the outside of said encircled pipe and the inside of said housing upon actuation thereof;
    fluid pressure actuatable gripping means carried by each of said housings and arranged for frictionally engaging the outside surface of said pipe on which said housing is mounted upon actuation thereof to thereby rigidly attach said housing to said pipe;
    means for selectively applying fluid generated pressure to said housings to thereby actuate said sealing means and said gripping means;
    each of said housings having a mating bias flange end, with said ends having adjacent parallel faces when in the mounted position on said pipes;
    each of said flange ends being provided with a plurality of mating bolt holes circumferentially spaced thereabout;
    at least one of said flange ends including a clamp ring having said bolt holes therein and rotatably supported and held against generally radial movement on a bias flange support portion on one said flange end;
    and a plurality of bolts rigidly connecting said flange ends together to thereby rigidly interconnect said pipes for flow of fluid therethrough.

2. The invention as claimed in claim 1 including:
    means positioned between said bias flange support portion and the radial inward side of said clamp ring for easing rotation of said clamp ring relative to said coupling during assembly of said construction.

3. The invention as claimed in claim 2 wherein:
    said bearing means for easing rotation of said clamp ring relative to said coupling includes a plurality of ball bearings mounted in mating generally radially facing races between the radially inward side of clamp ring and a radially outward surface of said bias flange support portion.

* * * * *